J. G. HARRIS.
ANTISLIPPING DEVICE FOR HORSES AND OTHER ANIMALS.
APPLICATION FILED MAR. 26, 1912.
1,032,138.
Patented July 9, 1912.
3 SHEETS—SHEET 1.
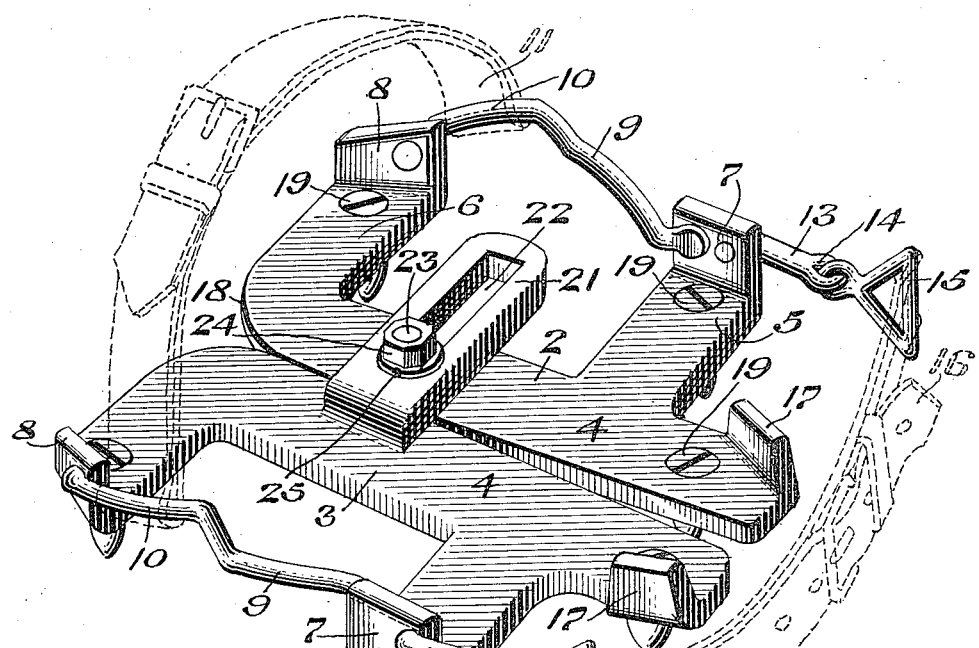
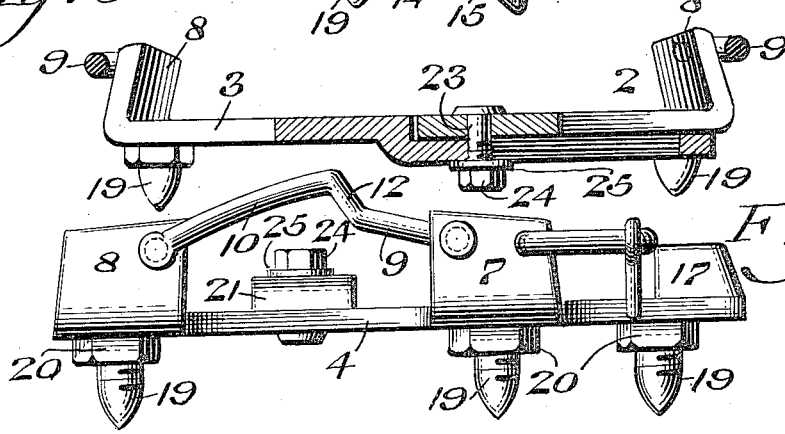

J. G. HARRIS.
ANTISLIPPING DEVICE FOR HORSES AND OTHER ANIMALS.
APPLICATION FILED MAR. 26, 1912.
1,032,138.
Patented July 9, 1912.
3 SHEETS—SHEET 2.
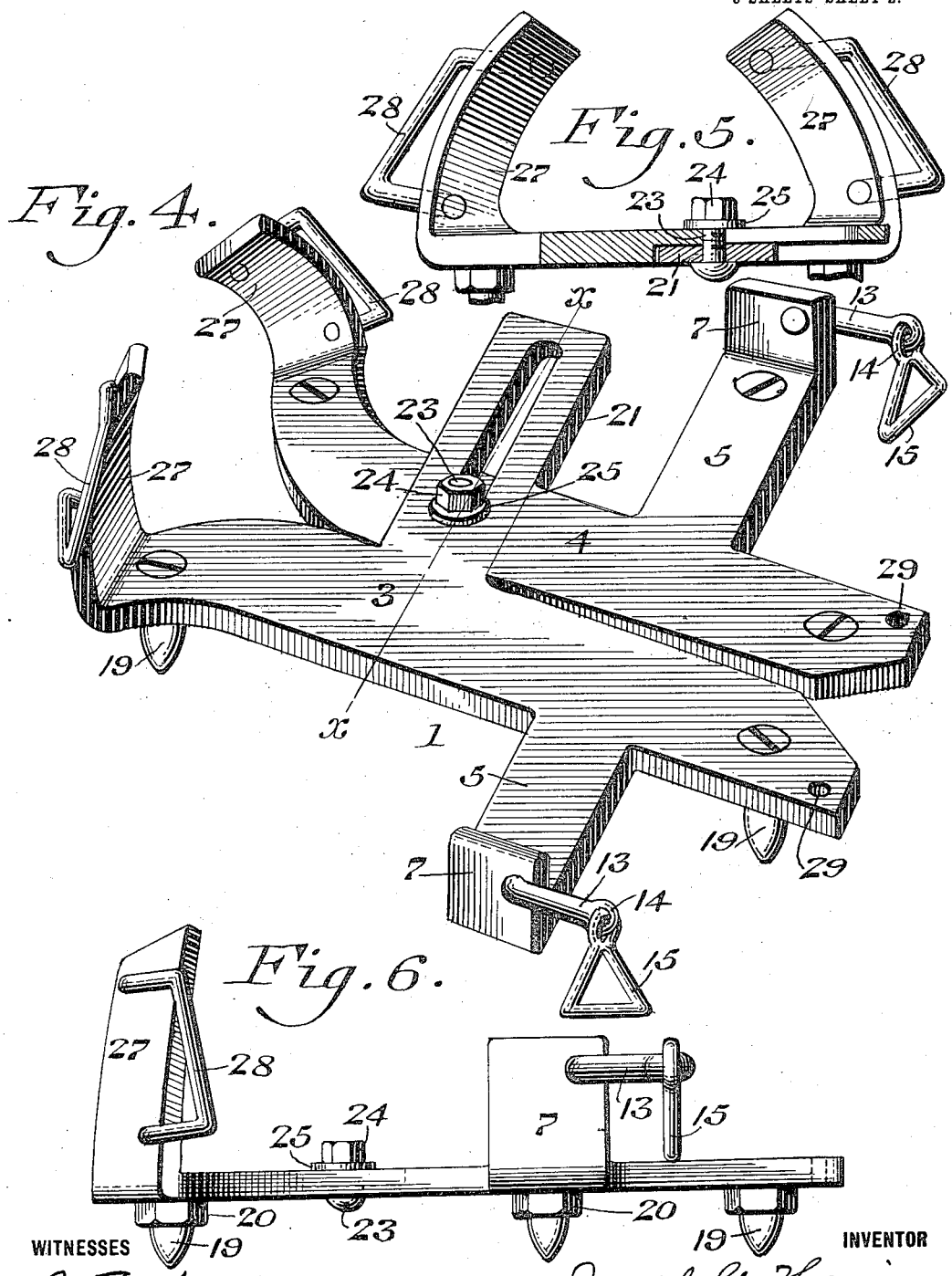

J. G. HARRIS.
ANTISLIPPING DEVICE FOR HORSES AND OTHER ANIMALS.
APPLICATION FILED MAR. 26, 1912.
1,032,138.
Patented July 9, 1912.
3 SHEETS—SHEET 3.
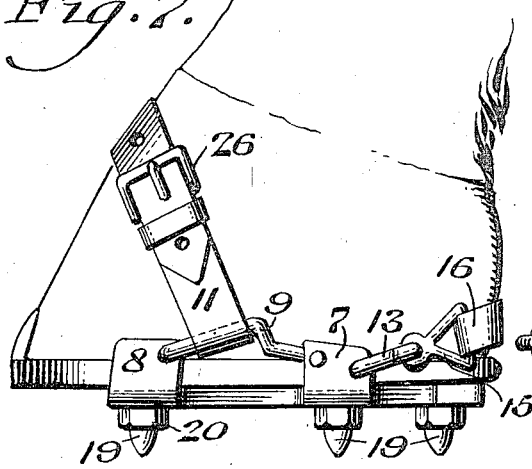
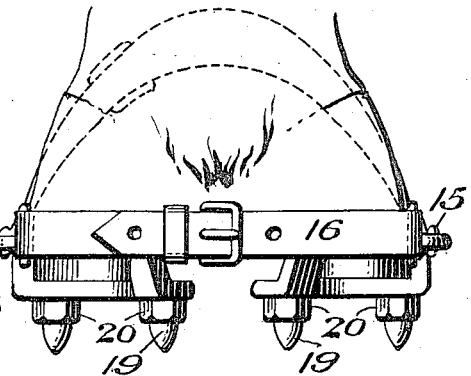
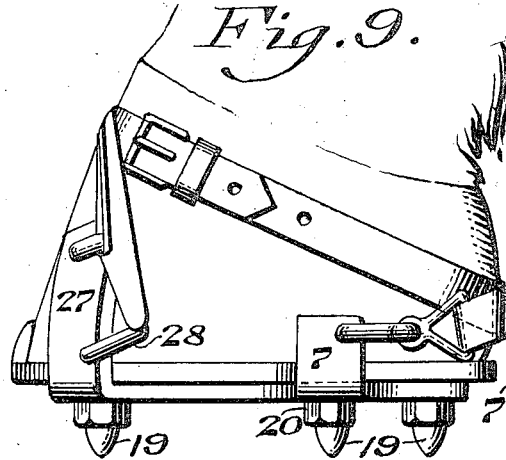
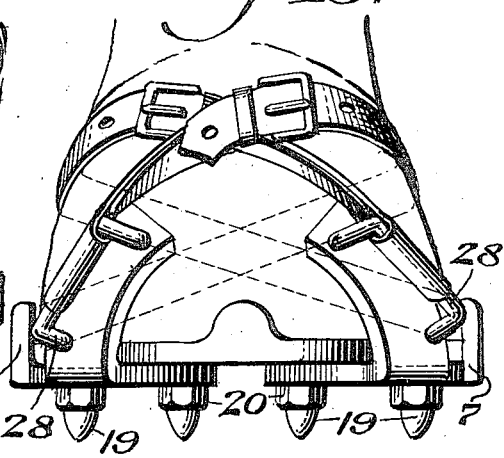
WITNESSES
P. F. Nagle.
L. Ouville.
INVENTOR
Joseph G. Harris.
BY Wiedersheim & Fairbanks
ATTORNEYS

UNITED STATES PATENT OFFICE.

JOSEPH G. HARRIS, OF PHILADELPHIA, PENNSYLVANIA.

ANTISLIPPING DEVICE FOR HORSES AND OTHER ANIMALS.

1,032,138. Specification of Letters Patent. Patented July 9, 1912.

Application filed March 26, 1912. Serial No. 686,281.

*To all whom it may concern:*

Be it known that I, JOSEPH G. HARRIS, a citizen of the United States, residing in the city and county of Philadelphia, State of Pennsylvania, have invented a new and useful Antislipping Device for Horses and other Animals, of which the following is a specification.

This invention relates to anti-slipping devices for horses and other animals, and has for an object to provide a creeping device which is adapted to be attached to each foot of the animal and form a friction surface which will prevent slipping or sliding on ice or snow covered surfaces, and is also just as effective on wet slimy or muddy surfaces.

It has for a further object to provide an anti-slipping device which may be readily attached or detached to or from the animal's foot, and which when in operative position is so arranged as to bind tightly on the foot and the working pressure exerted by the animal in walking or running instead of tending to loosen the creeping device acts to more firmly secure the same to the foot.

It further consists of other novel features of construction, all as will be hereinafter fully set forth.

For the purpose of illustrating my invention, I have shown in the accompanying drawing the form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective of an anti-slipping device embodying my invention. Fig. 2 represents a side elevation of the same. Fig. 3 represents a transverse section of another form of the device. Fig. 4 represents a perspective of another form of my invention. Fig. 5 represents a section on line $x$—$x$ Fig. 4. Fig. 6 represents a side elevation of the embodiment shown in Fig. 4. Fig. 7 represents a side elevation of the device in operative position, showing one form of strap attachment. Fig. 8 represents a rear view of the same. Fig. 9 represents a side elevation of another form of fastening device. Fig. 10 represents a rear view of the same. Fig. 11 represents a plan of the device showing still another arrangement of the fastening devices.

Similar numerals of reference indicate corresponding parts in the figures.

Referring to the drawings, 1 designates an anti-slipping device embodying the features of my invention and which, in the present instance, is formed in two sections 2 and 3, which except for the connecting means between the sections, are substantially similar and therefore for the purpose of pointing out the essential features of the device, the description of one section is though to be sufficient.

4 designates the body portion of one of the sections and which, in the present instance, is provided with laterally disposed side wings 5 and 6, the former of which terminates in an upwardly projecting side lug 7 angularly disposed with respect to the vertical sides of the wing 5 and inwardly inclined to form substantially the same angle as that formed by the hoof of the animal, whereby the said lug will closely fit the surface of the hoof. The wing 6 terminates in a like manner in a projecting lug 8 also angularly disposed with respect to the sides of the wing 6, but having an angle reverse to that of the lug 7 in order that it may accurately fit another portion of the animal's hoof. These lugs 7 and 8, in the present instance, are also utilized as a support for a fastening bar 9 which is connected in any suitable manner at each end to the lugs 7 and 8. It will be noted that this bar in the preferred arrangement has a portion 10 thereof upwardly disposed with respect to the lug 8, which portion is of substantially the same length as the width of the fastening means, such as a strap 11, while the remaining portion of the said bar is bent substantially at right angles, as shown at 12, to the portion 10, and joins the lug 7. This construction provides a stiff, strong and effective means for securing the supporting strap and the novel formation and inclination of the portion 10 affords a means for maintaining the fastening strap 11 in proper position upon the hoof of the animal and prevents the same from slipping and becoming loose.

13 designates a pin or lug fixedly secured to the lug 7 and terminating in an eye 14 which carries an eyelet member 15, which serves as a securing means for the fastening means, such as a strap 16. It will here be noted that the body portion of each section preferably extends rearwardly of the wing 5 and terminates in an angularly positioned upstanding lug 17, the function of which is to grip or engage the inner rear portion of the hoof. It will also be noted that the forward end of the body portion 4 is curved, as shown at 18, and continues as the wing 6, this curving edge being adapted to coact with the corresponding curving edge of the opposite section and permit the proper movement between the two sections during the adjusting of the device to the foot of the animal.

19 designates screw-threaded creeper points which are threaded into the sections at suitable points and are preferably maintained in adjusted position by means of the lock nuts 20, and it will thus be seen that in case any of these points become worn or broken, it is an easy matter to remove the same and insert a new one in place.

The sections of the device, in the present instance, are secured together in an adjustable manner and for this purpose I preferably form on one of the sections, here shown as 3, an integral link 21 projecting from the body portion 4 and adapted to receive within the slot 22 thereof, the bolt 23 which is riveted or otherwise secured to the opposite section. A suitable nut 24 and washer 25 are provided to fixedly secure the parts together after a proper adjustment. In connection with this fastening means it will be noted that the link 21 may either be formed on the upper surface of its section or on the lower surface thereof, and in Fig. 1, I have shown it in the former position, while in Fig. 3, I have shown the latter modified structure.

In Figs. 7 and 8, I have shown the manner in which the above described creeping device is attached to the hoof of the animal and by reference to these figures, it will be seen that the strap 11 or other suitable means, passes from the bar 9 on one side of the hoof across the forward part thereof and joins the bar 9 on the opposite side, being of course tightly drawn by means of the usual strap buckle 26. The strap 16 or other suitable means, passes from one side to the other of the hoof across the rear portion and tightly connects the eyelet members 15.

In the modification shown in Fig. 4, the body portion 4 of each section is provided with the side wings 5 and lugs 7, as heretofore described, but each forward end of the said body portions curves outwardly, upwardly and then inwardly to form the upstanding curved toe lug 27. This lug 27 has preferably riveted thereto a substantially U-shaped strap or fastener retainer 28 suitably disposed at the proper angle to permit the strap to pass as desired over the hoof or foot of the animal. In this embodiment of the invention the two sections 2 and 3 are adjustably secured together by the link and bolt construction heretofore described, though in this instance the link 21 is preferably in the same plane as the body portion 4 and coöperates with a suitable opening formed in the opposite section, as will readily be understood from Fig. 4. Similar lugs or points 19 are provided as in the previously described construction and the strap supporting eyelet members 15 are also preferably utilized.

29 designates an aperture formed in the rear end of each of the sections which provides means for attaching a fastening device comprising chain links 30 which terminate in the apertured members 15 to receive the fastening straps supported on the fastener retainers 28.

In Figs. 9 and 10 the modification of Fig. 4 is shown in normal operative position upon the foot of an animal, and it will be noted that two straps are employed which pass respectively from the retainer 28 diagonally around the hoof and join the eyelet member 15 and by reference to Fig. 10 the arrangement of the straps will readily be apparent.

It will now be apparent that I have devised a novel and useful construction of an anti-slipping device for horses and other animals, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In an anti-slipping device, a body portion formed in sections, a slotted arm carried by one section, means carried by another section adapted to engage said arm to form an adjustable connection, a plurality of side wings outwardly disposed on each of said sections, an upwardly projecting lug on each wing, a retainer connecting a pair of adjacent lugs on each side of said body portion, a fastening member detachably connected to said retainer and adapted to secure said device to the foot of an animal, a rearwardly disposed eyelet member movably connected to a lug on each body portion section, an adjustable securing element connecting said eyelet members, and a plurality of anti-slipping devices projecting from the lower surface of said device.

2. In an anti-slipping device, a body portion formed in sections, means for adjustably securing said sections together, pairs of oppositely and outwardly extending wings carried by each body portion section and arranged in substantially parallel relation, an upwardly projecting lug on each wing and angularly disposed to conform to the outer portion of an animal's hoof, a retaining bar connecting each pair of lugs, an adjusting strap for connecting said bars, a rearwardly extending pin fixedly secured to a lug of each section, an eyelet member movably connected to each of said pins, an adjusting element connecting said eyelets, and a plurality of anti-slipping devices projecting from the lower surface of said body portion.

3. In an anti-slipping device, a body portion formed in sections and adapted to be fastened beneath the longitudinal axis of an animal's foot, means for adjustably securing said sections together, a pair of laterally disposed wings integral with each section and arranged in substantially parallel relation, the respective wings of each pair being substantially in alinement, a lug on each wing projecting upwardly and angularly disposed with respect to said wings, a fastening device for adjustably connecting said body portion to the hoof of an animal, means carried by said lugs for engagement by said fastening device, a fastening element adapted to pass about the rear portion of said animal's foot, means to connect said element to a pair of said lugs, angularly disposed lugs on the rear portion of each section forming an abutment to prevent longitudinal movement of said sections with respect to said animal's foot, and a plurality of anti-slipping devices projecting from the lower surface of said body portion.

JOSEPH G. HARRIS.

Witnesses:
C. D. McVay,
M. C. Fox.

---

Copies of this patent may be obtained for five cents each, by addressing the "Commissioner of Patents, Washington, D. C."